United States Patent [19]

Buttner

[11] 3,941,400
[45] Mar. 2, 1976

[54] PLOW DOLLY

[76] Inventor: Peter Buttner, 92 Sunset Road, Weston, Mass. 02193

[22] Filed: Sept. 20, 1974

[21] Appl. No.: 507,888

[52] U.S. Cl. .................... 280/79.1; 254/92; 269/17
[51] Int. Cl.² ........................................... B62B 5/00
[58] Field of Search ............... 280/79.1, 62; 254/92; 269/17

[56] References Cited
UNITED STATES PATENTS

| | | | |
|---|---|---|---|
| 1,559,391 | 10/1925 | Waters | 269/17 X |
| 2,904,308 | 9/1959 | Vergara | 269/17 X |
| 3,132,875 | 5/1964 | Plumly | 280/79.1 X |
| 3,318,466 | 5/1967 | Baxley | 269/17 X |
| 3,850,419 | 11/1974 | Craig | 269/17 |

Primary Examiner—M. H. Wood, Jr.
Assistant Examiner—Michael J. Forman
Attorney, Agent, or Firm—Kenway & Jenney

[57] ABSTRACT

A dolly for a plow or other utility attachment of the type having a blade and a yoke with spaced means for connection to a vertically adjustable lift bracket on a vehicle. The dolly is self-supported on wheel means and comprises a blade support on which the plow blade may be lowered by vertical movement of the lift bracket, and a pair of manually and independently adjustable, mutually spaced yoke lift means each engageable with the plow yoke for supporting and vertically adjusting the spaced means for connection in relation to the lift bracket.

4 Claims, 4 Drawing Figures

PLOW DOLLY

GENERAL DESCRIPTION OF THE PLOW DOLLY

The Plow Dolly is a three-castered, triangular framework with an adjustable yoke support assembly designed to greatly simplify the disconnection, movement, storage and reconnection of detachable plow assemblies.

When attached to utility vehicles, plows designed for snow removal or light grading can be operated by one person. However, when detached from the vehicle, plow assemblies are too heavy to be moved easily by the operator. The fact that the plow yoke is attached to the vehicle frame at two points which cannot be seen while operating the vehicle makes reconnection especially difficult when the vehicle is driven up to the plow. Dollying the plow to the vehicle eliminates both the visual problem and the difficulty of matching the drop-off angle.

The yoke support assembly is the principal unique feature of the Plow Dolly. Although the free-standing yoke can be lifted by one person, it is virtually impossible to do so while crouching under the front of the vehicle attempting to insert a pin. Separate adjusting screws which raise each side of the yoke independently (within the range of the vertical rotational slack that exists between the blade and yoke) permit precise vertical alignment. Having the assembly an integral part of the dolly is essential to permit final horizontal alignment without affecting the vertical alignment.

Secondary features of the Plow Dolly include 1) a V channel, and 2) provision for mounting the yoke support assembly at different distances from the V channel to accommodate different yoke assemblies or different vehicle front-end configurations.

DESCRIPTION OF THE DESIGN

Figure 1:
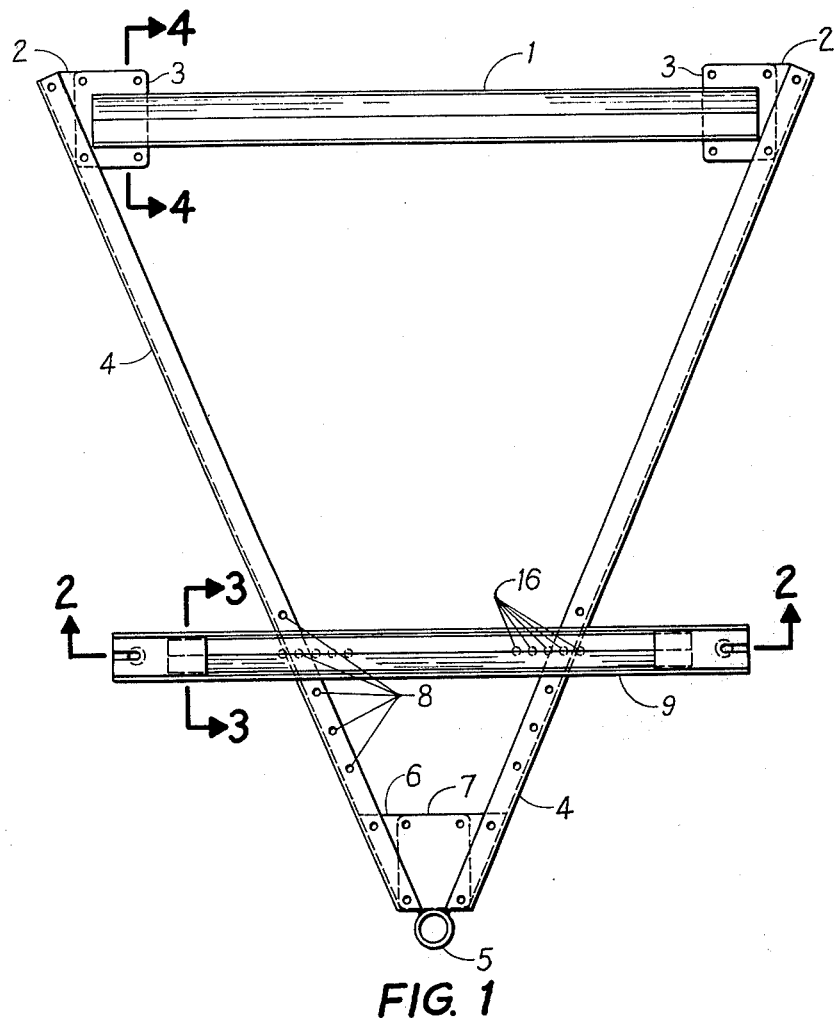
FIG. 1 is a top plan view of a Plow Dolly as described herein.
Figure 2:
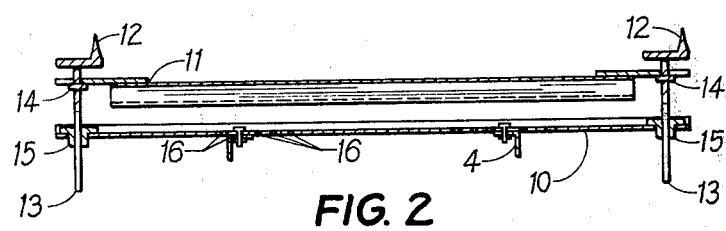
FIG. 2 is a vertical section across the long dimension of the yoke support assembly, showing lift-screw detail, etc.
Figure 3:
FIG. 3 is a vertical section across the short dimension of the yoke support assembly at a point which best shows the configuration of the top and bottom support members.
Figure 4:
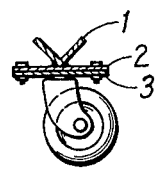
FIG. 4 is a vertical section which shows the relationship between the V channel, caster mounting plate and caster.

The Plow Dolly illustrated in FIGS. 1–4 is constructed principally of steel, although other materials including wood are suitable for the frame and yoke support assembly.

The base of the Dolly is a triangular frame attached to three casters. The V channel 1 (angle iron in this case) in which the plow blade rests is welded at each end to the top of the front caster support plates 2, which are bolted to the front casters 3. The side rails 4 of the frame are bolted to the caster support plates 2 and 6. A towing ring 5 is welded to the rear caster support plate 6, which is attached, also by bolts, to the rear caster 7. Holes 8 are located at intervals along the rear portions of the side rails 4 to permit positioning the yoke support assembly 9 at different distances from the V channel 1.

The yoke support assembly 9 consists of a bottom member 10; a top member 11; and two lift screw assemblies each consisting of a turning handle 12, a threaded rod 13, a collar 14 attached to the rod to support the top member 11, and a nut or other threaded piece 15 attached to the bottom member 10. Holes 16 are located at intervals along the bottom member to match the holes 8 in the side rails 4.

DESCRIPTION OF USE

The following use description assumes a plow assembly initially attached to a vehicle and in the raised position:

1. The V channel 1 of the Plow Dolly is centered under the plow blade with the yoke support assembly 9 under the plow yoke; the top member 11 is adjusted to the lowest position by turning the lift-screw handles 12;

2. The plow blade is lowered into the V channel 1;

3. The lift screw handles 12 are turned to raise the top member 11 until it just engages the yoke on both sides, then raised slightly more until slack is created on the pins which hold each end of the yoke to the vehicle frame;

4. The pins are easily removed; other connecting items such as lift chain and hoses are disconnected;

5. The plow assembly can be moved on the dolly to any convenient storage location, and the yoke can be further raised or lowered as desired;

6. For reconnection, the yoke is re-adjusted by the lift screws to the approximate height of the vehicle bracket and the plow assembly is moved on the dolly to the vehicle so the ends of the yoke engage the vehicle bracket;

7. Small adjustments of each lift screw permit exact alignment of the pin holes so that each pin can be easily inserted;

8. After other connections are made, the plow can be raised off the Dolly, which can then be moved clear.

The four operations made substantially easier and faster by the Plow Dolly are the removal of connecting pins, movement and storage of the plow assembly when disconnected from the vehicle, repositioning of the assembly for reconnection, and insertion of the pins.

I claim:

1. A dolly for connection and disconnection of a utility attachment to and from a vehicle having vertically adjustable lift bracket means, the utility attachment having a yoke with mutually spaced means for connection to the bracket means and blade means spaced from and attached to the yoke, the blade means extending laterally across a perpendicular bisector of a line between said means for connection, said dolly having a self-supported, wheeled frame having a pair of side rails, a blade support member connecting the side rails and yoke support means secured to each of the side rails in spaced relation to the blade support member, a plurality of mutually spaced wheel means on the frame substantially supporting the blade support member and at least one additional wheel means on the frame substantially supporting the yoke support means, and a pair of mutually spaced yoke lift means on the yoke support means, each engageable with and in lifting relation to a portion of the yoke and vertically adjustable manually and independently of the other yoke lift means to vary the height of one of said mutually spaced means for connection relative to the lift bracket means.

2. A dolly according to claim 1, in which the frame is triangular, the blade support member forming the base thereof, the yoke support means being elongate and extending across a perpendicular bisector of said base and being secured to each of the side rails at a point between the angles of the frame.

3. A dolly according to claim 2, in which said point is adjustable along at least one of the side rails.

4. A dolly according to claim 1, in which the yoke lift means comprise a rigid bottom member secured to the frame, a rigid top member engageable with and in lifting relation to the yoke, and a pair of mutually spaced, independently extendable lift screw means each extending between the bottom and top members.

* * * * *

UNITED STATES PATENT OFFICE
CERTIFICATE OF CORRECTION

PATENT NO. : 3,941,400
DATED : March 2, 1976
INVENTOR(S) : Peter Büttner

It is certified that error appears in the above-identified patent and that said Letters Patent are hereby corrected as shown below:

In the inventor's last name, add the umlaut to the letter "u".

Signed and Sealed this first Day of June 1976

[SEAL]

Attest:

RUTH C. MASON
*Attesting Officer*

C. MARSHALL DANN
*Commissioner of Patents and Trademarks*